United States Patent [19]

Koch

[11] Patent Number: 5,235,735
[45] Date of Patent: Aug. 17, 1993

[54] APPARATUS FOR CUTTING AND INSULATION STRIPPING OF AN ELECTRICAL CABLE

[75] Inventor: Max Koch, Meggen, Switzerland

[73] Assignee: TTC Technology Trading Company, Meggen, Switzerland

[21] Appl. No.: 868,866

[22] Filed: Apr. 16, 1992

[30] Foreign Application Priority Data

Apr. 17, 1991 [CH] Switzerland .................. 01 148/91-7

[51] Int. Cl.$^5$ ............................................. H01R 43/04
[52] U.S. Cl. ..................................... 29/564.4; 81/9.51
[58] Field of Search ................. 29/564.4, 33 M, 564.6, 29/566.1; 81/9.51

[56] References Cited

U.S. PATENT DOCUMENTS

| | | | |
|---|---|---|---|
| 4,091,695 | 5/1978 | Funcik et al. | 29/564.4 |
| 4,275,619 | 6/1981 | Shimizu | 29/33 M |
| 4,964,200 | 10/1990 | Giesbrecht | 29/33 M |
| 5,146,673 | 9/1992 | Hoffa | 29/564.4 X |

FOREIGN PATENT DOCUMENTS 0423443  4/1991  European Pat. Off. .

OTHER PUBLICATIONS

Operator's Manual 40-S of Komas AG, Section 5.
Product Sheet of SHIN MEIWA INDUSTRY CO., LTD., from Inter Nepeon Exhibition, Jan. 1991.
European Search Report and Annex.

*Primary Examiner*—William Briggs
*Attorney, Agent, or Firm*—Sandler, Greenblum & Bernstein

[57] ABSTRACT

With the apparatus there can be cut an electrical cable in a minimum amount of time and the cable can have selectively different electrical insulation lengths stripped therefrom, without requiring exchange of the cutting and insulation stripping tool upon switching over to a different insulation stripping length and/or to a different cable cross-section. For this purpose, two respective insulation stripping blades are arranged at a predetermined fixed distance from a cutting blade in each of two cutter holders. The insulation stripping blades are shorter in length in relation to the length of the cutting blades by an amount such that during a first part of a work or working cycle only the cable is cut. A retraction drive retracts the cable ends from the cutting location through the desired insulation stripping length, whereafter, during a second part of the work cycle there is cut into the electrical insulation, and during a further retraction movement of the cable ends the insulation waste is pulled off with the insulation stripping blades closed.

6 Claims, 3 Drawing Sheets

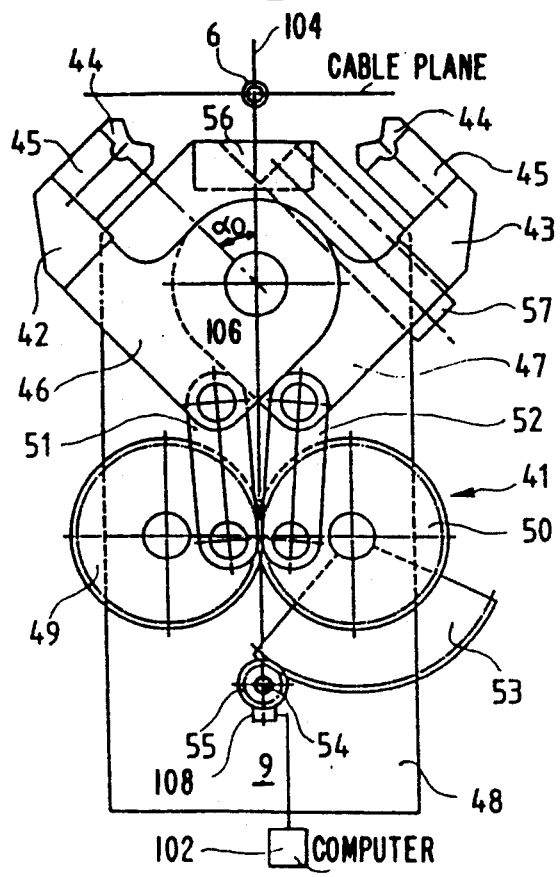
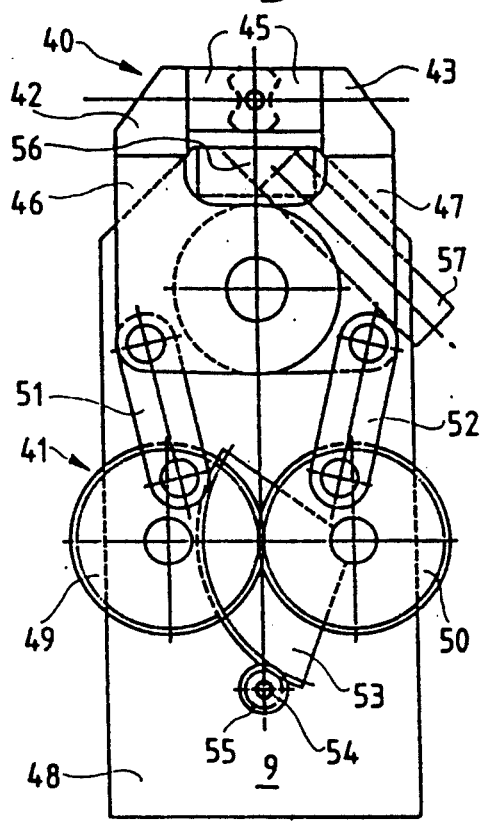
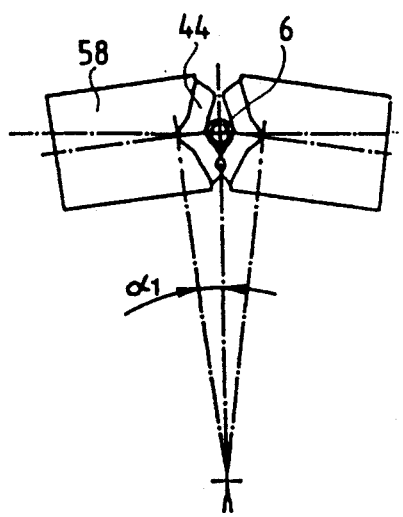
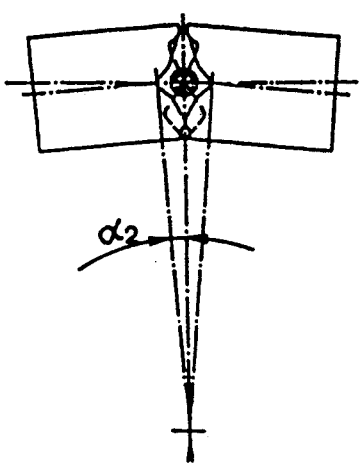
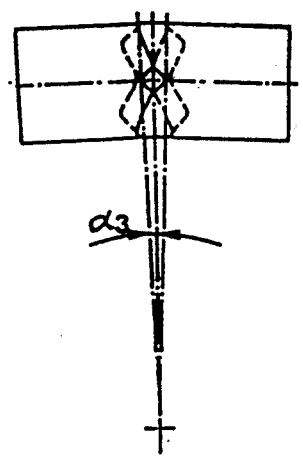

APPARATUS FOR CUTTING AND INSULATION STRIPPING OF AN ELECTRICAL CABLE

CROSS REFERENCE TO RELATED APPLICATIONS

This application is related to the commonly assigned copending U.S. application Ser. No. 07/780,483, filed Oct. 22, 1991, entitled "Apparatus for Transporting Cable Lengths or Sections", and the commonly assigned copending U.S. application Ser. No. 07/820,008, filed Jan. 13, 1992, and entitled "Apparatus for Infeeding a Cable to an Automatic Cable Processing Machine".

BACKGROUND OF THE INVENTION

1. Field of the Invention

The present invention relates to a new and improved apparatus for cutting and insulation stripping of an electrical cable in an automatic cable processing machine. In the context of this disclosure the term "cable" is intended to also encompass wires and leads or the like.

Generally speaking, the apparatus of the present development for cutting and insulation stripping of an electrical cable in an automatic cable processing machine, is of the type comprising a tool composed of a first blade or knife holder and a second blade or knife holder. In each of the first and second blade holders or holder members there is arranged a respective cutting blade or knife and two insulation stripping blades or knifes. A drive serves to actuate the tool.

2. Discussion of the Background and Material Information

Cable processing machines enable the large scale economical production of electrical cables of the most different lengths, for example, for use with electrical equipment or motor vehicles. The cables are usually cut to the required length from cable material payed-off cable supply rolls and then stripped of their electrical insulation at both ends of each cut cable section. When required, the ends of the cable sections or lengths can be provided with plugs or terminals or other connection elements.

In the Operator's Manual 40-S of Komax AG., located at Dierikon, Switzerland, 1989, there is disclosed a cutting and insulation stripping tool which is suitable for use with such type cable processing machines and comprises a first blade holder and a second blade holder, each of which is equipped with a cutting blade and two insulation stripping blades. The insulation stripping blades are arranged at a distance from the cutting blade which corresponds to the desired insulation stripping length. In order to obtain tools which can be used in a versatile manner, the distance can be adjusted by spacer or distance plates, and graduations in the order of, for example, 5 mm. are possible. With such type tools the cable can be severed during a work cycle and at the same time there can be cut the electrical insulation. Upon changing the length of the electrical insulation which is to be stripped from the cable, the tool must be dismantled from the cable processing machine and again adjusted, resulting in interruption of cable processing and undesired downtime of the cable processing machine.

In a printed product sheet of the Japanese company, Shin Meiwa Industry Co. Ltd., located at 2-43, Shitte 3-chrome, Tsurumi-ku, Yokohama, Japan, indicated to be printed in Japan on "0.6.1.2" and believed to have been distributed at least as early as January 1991, there is described a tool which need not be exchanged upon changing the insulation stripping length. This tool comprises only one pair of cutting blades or cutters which is also used for insulation stripping of the cable. In order to strip the insulation, the cable following cutting, is pushed, by an amount corresponding to the desired insulation stripping length, between the cutting blades which have again been opened. Since two working or operating steps are required for such cutting and incision of the electrical insulation, the time required for such working operation is at least twice as great in comparison to the time needed when using the prior art tool discussed above in connection with the Operator's Manual 40-S of Komax AG. When manufacturing large quantities of cable having the same insulation stripping length, the encountered time loss thus can be considerable.

SUMMARY OF THE INVENTION

Therefore, with the foregoing in mind, it is a primary object of the present invention to provide an improved apparatus for cutting and insulation stripping of an electrical cable in an automatic cable processing machine, which is not afflicted with the aforementioned limitations and drawbacks of the prior art.

Another and more specific object of the present invention aims at providing an improved apparatus of the aforementioned type for cutting and insulation stripping of an electrical cable in an automatic cable processing machine, wherein it is not necessary to exchange the tool when altering the insulation stripping length, and the time required for cutting and insulation stripping is reduced in relation to the last previously discussed prior art Japanese tool.

Still a further noteworthy object of the present invention is directed to the provision of an improved apparatus for cutting and insulation stripping of an electrical cable in an automatic cable processing machine, in a highly reliable and efficient manner, wherein the apparatus is extremely versatile in enabling changeover in the cable production operation to different insulation stripping lengths.

Now in order to implement these and still further objects of the present invention, which will become more readily apparent as the description proceeds, the apparatus for cutting and insulation stripping of an electrical cable in an automatic cable processing machine of the present development is manifested, among other things, by the features that the insulation stripping blades are arranged at a predetermined fixed distance or spacing from the cutting blade, this distance or spacing corresponding to a maximum insulation stripping length which is attainable with the tool. The insulation stripping blades are shorter than the cutting blade. Specifically, the insulation stripping blades are shorter than the cutting blades by an amount which is dimensioned such that during a first part of the work cycle or stroke of the tool the cable is cut without 15 the insulation stripping blades cutting into the electrical insulation of the cable. Furthermore, there are provided two retraction drives for retracting the cable ends, produced by cutting of the cable, away from the cutting blades and such retracted cable ends are positionally adjusted at an insulation stripping length which is within a range defined by the maximum insulation stripping length. During a second part of the work cycle or stroke of the tool the electrical insulation is cut and during a further part of the retraction movement of the cable ends the insulation waste is stripped from the cable ends while the insulation stripping blades remain in cutting position.

According to a further aspect, the blade holders are each secured to a respective lever member. These lever members are pivotally mounted at a support or carrier member for pivotable movement about a common pivot point or fulcrum. The drive for actuation of the tool comprises two interengaging gears rotatably mounted at the support or carrier member. One of the gears is connected by a first pivot structure or link means with one of the lever members, and the other gear is connected by a second pivot structure or link means with the other lever member. A toothed segment or element is connected with this other gear and meshes with a pinion arranged at a shaft of a drive motor.

Still further, the retraction drive comprises a base plate or plate member provided with first and second bearing portions. The shaft of a drive motor is mounted at the base plate, and in the first and second bearing portions there is mounted a threaded spindle extending substantially perpendicular to the shaft. A respective bevel gear seated at the shaft and at the threaded spindle, respectively, mesh with one another. A support or support member is arranged at the threaded spindle. This support is guided by guide elements, such as bolts in the second bearing portion and at which there is secured a clamping device for the retention or holding of the cable.

It is further contemplated to arrange form insulation stripping blades or V-shaped insulation stripping blades at the blade holders. The drive for the actuation of the tool is controlled by a programmable computer, and the positions of the blade holders, during the work or working cycle or stroke, can by preselected by appropriate program means or programming of the programmable computer as a function of the thickness of the electrical insulation and the type of insulation stripping blades which are employed.

An additional aspect of the present invention resides in the fact the retraction drives are controlled by a programmable computer, and the angle of rotation of the threaded spindle, and thus, the retraction of the cable ends can be preselected with respect to a desired or predetermined insulation stripping length, and equally, the further retraction of the cable ends for the purpose of stripping the insulation waste can be preselected by appropriate program means or programming of the programmable computer.

Some of the more notable advantages realized with the apparatus of the present invention especially reside in the fact that the fixed distance or spacing between the cutting blade and the insulation stripping blades can be chosen such that there are possible the attainment of insulation stripping lengths within a wide range, and thus, in contrast to the discussed prior art there practically does not arise any downtime owing to exchange of the tool. A further advantage which is achieved with the apparatus of the present invention, in contrast to the tool considered above as proposed by Shin Meiwa Industry Co. Ltd., is that the working operation entailing cable cutting and insulation stripping requires less time, and accordingly, the control program required for this purpose, is simpler.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIG. 3a depicts a cutting head of the inventive apparatus in the starting position;

FIG. 3b depicts the cutting head of FIG. 3a showing the tool in its end or terminal position;

FIGS. 4a, 4b and 4c depict the tool equipped with substantially V-shaped or V-insulation stripping blades, in three respectively different work or working positions.

DETAILED DESCRIPTION OF THE PREFERRED EMBODIMENTS

Describing now the drawings, it is to be understood that only enough of the construction of the inventive apparatus for cutting and insulation stripping of an electrical cable has been depicted therein, in order to simplify the illustration, as needed for those skilled in the art to readily understand the underlying principles and concepts of the present invention.

Figure 1:
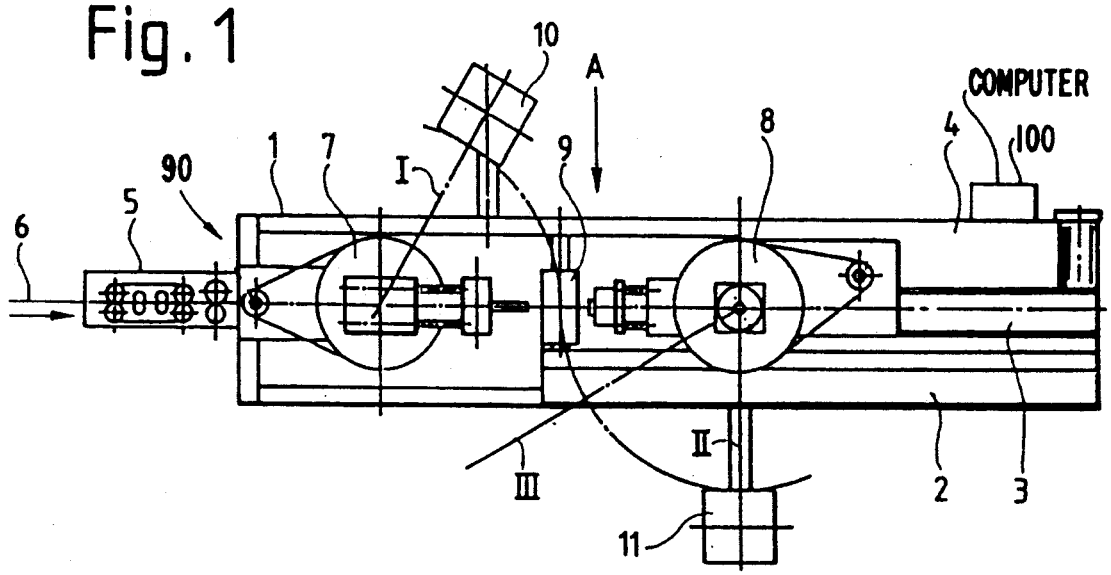
FIG. 1 is a simplified top plan view of a cable processing machine containing an apparatus for cutting and insulation stripping of an electrical cable constructed according to the present invention.

Turning attention to FIG. 1, there is shown a machine frame 1 of a cable processing machine, generally indicated by reference numeral 90. At the machine frame 1 there is arranged a receiver vat or receptacle 2 for the reception of finished processed cables or cable sections as well as a transport belt or band 3 for the outfeed of such cables or cable sections. A control panel or console 4 contains the equipment or structure needed for controlling the cable processing operation or process. Reference numeral 5 designates a belt or band drive, by means of which the unworked cable 6 is payed-off a suitable and therefore here not illustrated cable supply, typically a cable supply roll or reel, and delivered to different processing stations. Suitable constructions of belt or band drive 5 are known to the art, and one such exemplary type of belt or band drive 5 which can be here employed has been disclosed in the commonly assigned European Published Patent Application No. 423,443, published Apr. 24, 1991 and the cognate U.S. application Ser. No. 07/571,325, filed Aug. 22, 1990, to which reference may be readily had and the disclosure of which is incorporated herein in its entirety by reference.

Continuing, it will be seen that at the machine frame 1 there is secured a first component or unit 7 and a second component or unit 8, by means of which the cable 6 is fixedly held and can be brought into different processing positions. These first and second cable fixing and positioning components or units 7 and 8 will be more fully considered hereinafter with reference to FIG. 2. A cutter head or head member 9 is arranged between the first and second cable fixing and positioning components or units 7 and 8 and will be described shortly based upon the drawings of FIGS. 3a and 3b. The cutter head or head member 9 is capable of cutting and insulation stripping the cable 6. It will be also understood a first processing station 10 and a second processing station 11 are secured to the machine frame 1. These first and second processing stations 10 and 11 are constituted by, for instance, commercially available devices by means of which there can be affixed plugs or terminals or other appropriate connection elements to the insulation stripped ends of the cables, in other words, the processed cables or cable sections or lengths.

Figure 2:
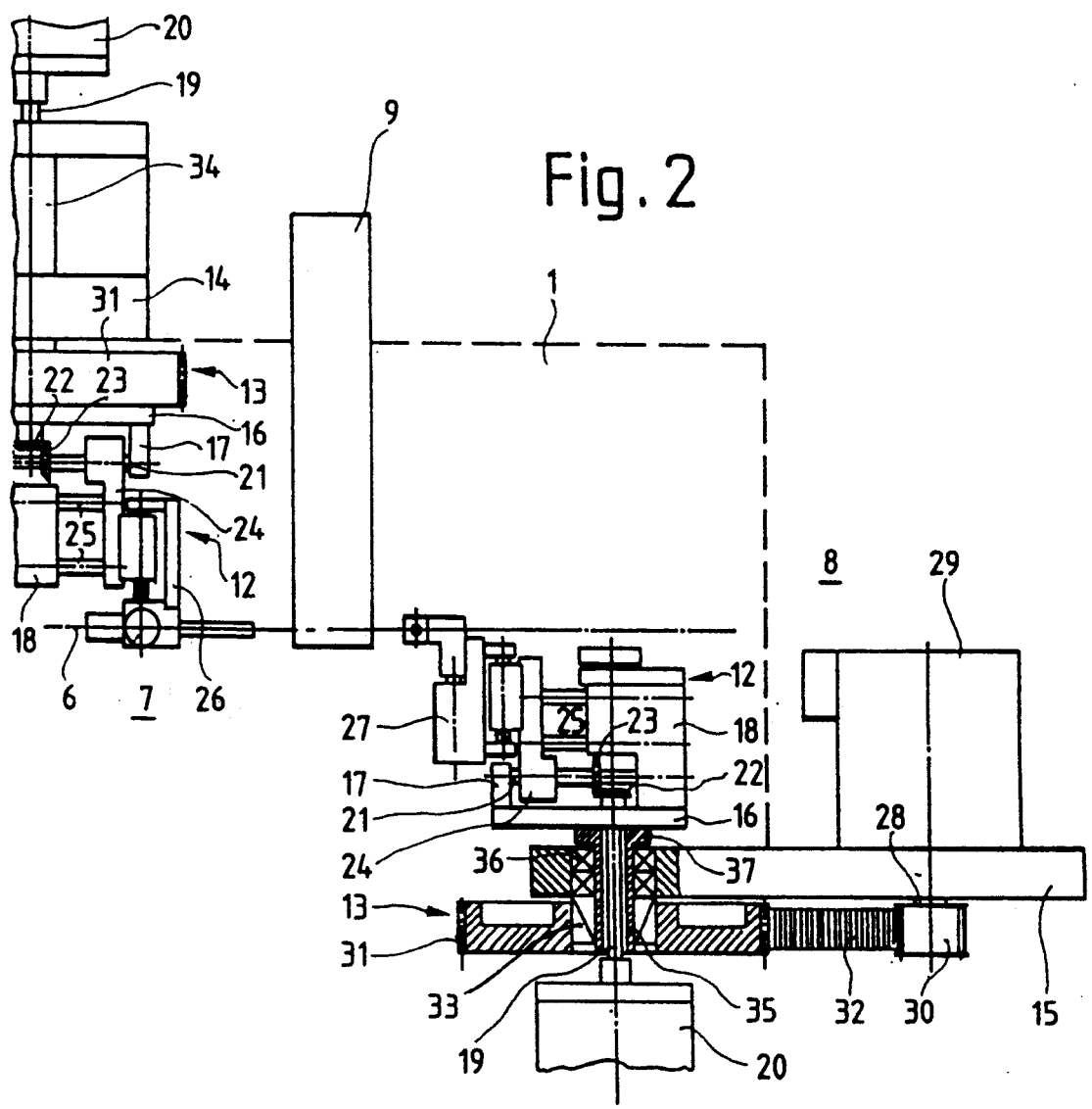
FIG. 2 is a partial sectional view of a portion of the cable processing machine looking in the direction of the arrow A of FIG. 1 and depicted on an enlarged scale in relation thereto.

According to the showing of FIG. 2 it will be seen that the first and second cable fixing and positioning components or units 7 and 8 each comprise a retraction or withdrawal drive 12 and a pivot drive 13, which are arranged at supports or support members 14 and 15, respectively, and which are fastened in any suitable manner, as merely schematically represented by the broken lines, at the machine frame. Each retraction or withdrawal drive 12 contains a base plate or plate member 16 and a first bearing portion or part 17 and a second bearing portion or part 18. At the base plate 16 there is mounted a shaft 19 of a drive motor 20. In the first and second bearing portions or parts 17 and 18 there is mounted a threaded spindle or spindle member 21 positioned substantially at right angles or perpendicular to the shaft 19. A bevel gear 22 fixedly seated upon the shaft 19 and a bevel gear 23 fixedly seated upon the threaded spindle 21 mesh with one another.

A support or support member 24 is arranged upon the threaded spindle 21, and this support or support member 24 is guided by suitable guide elements, here, for instance, bolts 25 in the second bearing portion or part 18. At this support 24 of the retraction or withdrawal drive 12 of the first cable fixing and positioning unit 7 there is fastened a first clamping device 26, and at the support 24 of the retraction or withdrawal drive 12 of the second cable fixing and positioning unit 8 there is fastened a second clamping device 27. These clamping devices 26 and 27 serve for holding the cable and, for instance, can be pneumatically actuated. The retraction or withdrawal drives 12 can be controlled by an appropriately programmable computer 100, whereby the angle of rotation of the threaded spindle 21, and thus, the displacement path of the supports or support members 24 with the clamping devices 26 and 27 and the cable can be preselected by correspondingly programming such computer.

The pivot drives or drive means 13 each comprise a first toothed disk or disk member 30 seated upon shaft 28 of a further drive motor 29 and a second, larger size toothed disk or disk member 31. The first and second toothed disks 30 and 31 are operatively interconnected by a toothed belt 32. Each respective second toothed disk 31 is keyed by wedges or keys 33 or equivalent structure to a hollow shaft 34 and 35, respectively, and is mounted at the respective support or support member 14 and 15 by means of ball bearings 36 or the like. The hollow shaft 35 which is operatively associated with the pivot drive 13 of the second cable fixing and positioning unit 8, comprises a flange 37 at which there is fastened the associated retraction or withdrawal drive 12 with the base plate 16. The hollow shaft 34 of the pivot drive 13 of the first cable fixing and positioning unit 7 does not have any flange, and the associated retraction or withdrawal drive 12 with the base plate 16 is secured at the second toothed disk 31. Each respective base plate 16 is fastened in each instance such that the shaft 19 of the drive motor 20 of the retraction or withdrawal drive 12 extends coaxially within the associated hollow shaft 34 and 35, respectively.

As will be seen by inspecting FIGS. 3a and 3b, the cutter head or head member 9 is provided with a tool 40 and a drive 41 for actuating the tool 40. This tool 40 comprises a first blade holder or holder member 42 and a second blade holder or holder member 43, in each of which there is arranged a respective cutting blade or knife 44 and two respective insulation stripping blades 45. The here exemplary depicted insulation stripping blades 45 are so-called form-insulation stripping blades 45, which are particularly useful for stripping thin-walled electrical insulation. As will be explained more fully in connection with FIGS. 5a to 5d, the insulation stripping blades 45 are shorter in length than the length of the cutting blades or knives 44. Each of the blade holders 42 and 43 are secured to an associated pivot lever or lever member 46 and 47, which are pivotally mounted at a support or carrier member 48 for pivotable movement about a common pivot point or fulcrum 106. The drive 41 comprises two intermeshing gears 49 and 50 rotatably mounted at the support or carrier member 48. The first gear or gear member 49 is connected by a first pivot structure or link 51 with the one lever member 46, and the other or second gear or gear member 50 is connected by a second pivot structure or link 52 with the other lever member 47. At the other gear 50 there is attached a toothed segment 53 or equivalent, which meshes with a pinion 55 mounted on a shaft 54 of a drive motor, generally indicated by reference numeral 108. Reference numeral 56 designates a recess or depression at the support member 48 where there is caught the stripped insulation waste and by means of a pipe or conduit 57 such stripped insulation waste can drop into a suitable and here not shown waste container or receiver. The tool drive or drive means 41 can be controlled by a programmable computer, generally indicated by reference numeral 102 in FIG. 3a, so that there can be preselected, by appropriate programming of such computer the advance movement, the work stroke or cycle and the return movement of the tool 40.

With attention directed now to FIGS. 4a to 4c, reference numeral 58 designates substantially V-shaped or V-insulation stripping blades or knifes. FIG. 4a illustrates the position of the insulation stripping blades 58 at the start of cable cutting, FIG. 4b illustrates the position of such insulation stripping blades 58 at the end of cable cutting, and FIG. 4c illustrates the position of the insulation stripping blades 58 after cutting into the electrical insulation. The positions shown in FIGS. 4a and 4b are also valid as concerns the previously discussed form-insulation stripping blades 45, whereas the position thereof following cutting through the electrical insulation is shown in FIG. 3b.

According to FIGS. 5a to 5d the therein depicted form insulation stripping blades 45 as well as the there not specifically depicted V-shaped insulation stripping blades 58 are arranged at a predetermined fixed distance or spacing D from the cutting blades or knives 44, resulting in the predetermination of a desired maximum insulation stripping length. The insulation stripping blades, whether such be the blades 45 or 58, are shorter in length than the length of the cutting blades or knives 44 by an amount K which is dimensioned such that, while taking into account a maximum cable diameter, the electrical insulation immediately after cutting the cable 6 is not yet contacted by the insulation stripping blades 45 or 58, as the case may be. Reference numeral 59 (FIG. 5d) designates an insulation stripped cable end and reference numeral 60 designates the insulation waste. The working operations depicted on the basis of FIGS. 5a to 5d will be more fully considered with reference to the following description of the operation of the inventive apparatus for the cutting and insulation stripping of an electrical cable.

Such operation is as follows:

The belt or band drive 5 cyclically or intermittently transports the cable 6 withdrawn from the here not illustrated cable supply roll or reel to the region of the cutter head or head member 9 (FIG. 1). It will be understood that for such operation the cable 6 is only forwardly advanced each time by an amount controlled by a suitable length measuring device provided for the belt drive 5, which corresponds to the desired length of the cable or cable section or cable length to be produced. At this point in time the first and second clamping devices 26 and 27 (FIG. 2) are open and the tool 40 of the cutter head or head member 9 is in its starting position. During such time, the cutter holders 42 and 43, with an angle of $\alpha_0$ of approximately 45° related to a central vertical line 104, together with the cutting blades or knives 44 and the insulation stripping blades 45 or 58, as the case may be, are located beneath a substantially horizontally extending cable plane (FIG. 3a) determined by the position of the cable 6.

Figure 5A:
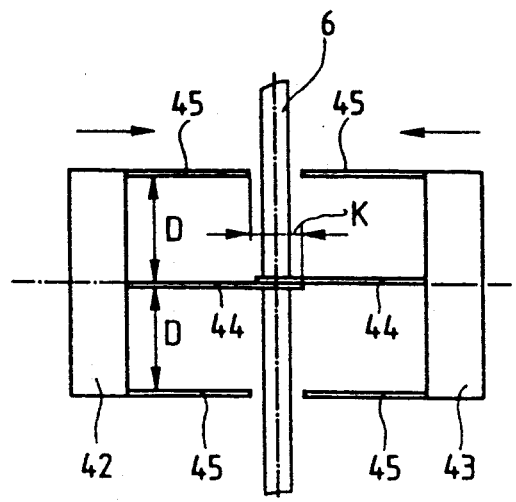
FIGS. 5a, 5b, 5c and 5d are respective schematic illustrations of the tool equipped with form-insulation stripping blades, in a number of different operating or working positions.

After clamping of the cable 6 in the first and second clamping devices 26 and 27, the drive or drive means 41 is turned on and the cutter holders 42 and 43 are pivoted towards the cable 6, wherein at an angle of the cutter holders 42 and 43 of, for example, $\alpha_1 = 7.6°$ there is initiated cutting of the cable 6 and at an angle $\alpha_2 = 4.8°$ such is completed (FIGS. 4a and 4b). After this first part of the working cycle or stroke the drive or drive means 41 is turned off, and the cutting blades or knives 44 overlap and the form-insulation stripping blades 45 or the substantially V-shaped insulation stripping blades 58, as the case may be, do not yet contact the electrical insulation of the cable (FIGS. 5a and 4b).

Figure 5B:
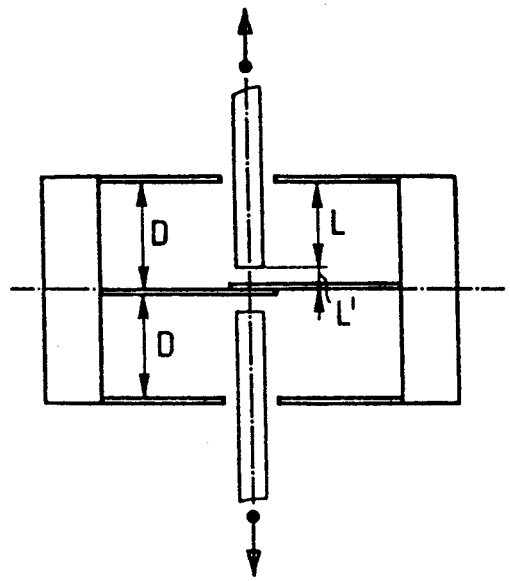
Figure 5C:
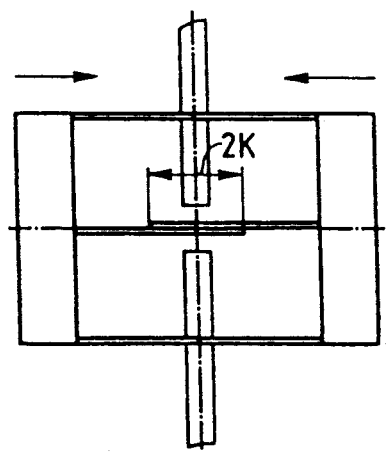
Figure 5D:
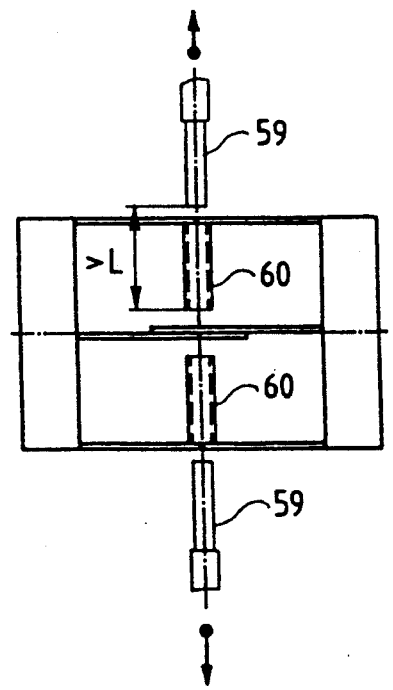

Now there are turned on the retraction or withdrawal drives 12 and the cable ends are retracted from the cutting blades or knives 44 by an amount L' which is dimensioned such that there is set a desired or predetermined insulation stripping length $L = D - L'$ (FIG. 5b). After turning off the retraction or withdrawal drives 12 there is again turned on the drive 41, and during a second part of the working cycle or stroke there is cut into the electrical insulation. In the case of the V-shaped insulation stripping blades 58 this cutting-in or incision operation, depending upon the cable cross-section, is completed with an angle of the blade holders 42 and 43 of, for example, $\alpha_3 = 2.2°$ to 0° (FIG. 4c), whereas when using form-insulation stripping blades 45 the cutting-in or incision operation is completed at an angle of 0° (FIGS. 3b and 5c) and the cutting blades or knives 44 overlap by an amount 2K.

Thereafter the retraction or withdrawal drives 12 are again turned on and the cable end is retracted by an amount which is greater than the insulation stripping length L. In this connection, the insulation waste 60 is stripped from the cable ends (FIG. 5d) during such time as the insulation stripping blades 45 or V-shaped insulation stripping blades 58, as the case may be, are still closed, and such insulation waste 60 is delivered by means of the recess or depression 56 and the waste removal pipe or conduit 57 (FIGS. 3a and 3b) into the here not shown but conventional waste container or receptacle. After returning the blade holders 42 and 43 into the starting position beneath the cable plane (FIG. 3a), the cable ends are pivoted by means of the pivot drives 13 of the first and second cable fixing and positioning units 7 and 8 in the cable plane to the processing stations 10 and 11 (FIG. 1, positions I and II). At that location there are connected, for example, plugs or terminals, with the insulation stripped cable ends 59. In position III of the pivot drive 13 the finished processed cable or cable section is deposited into the receiver vat or receptacle 2.

In order to protect the insulation stripped cable ends 59, in those instances where there are not fastened thereto plugs or other terminal or connection elements, the cable ends are only retracted by the associated retraction or withdrawal drive 12 by an amount which is smaller than the insulation stripping length L, so that the insulation waste 60 remains upon the cable end.

While there are shown and described present preferred embodiments of the invention, it is distinctly to be understood the invention is not limited thereto, but may be otherwise variously embodied and practiced within the scope of the following claims.

What is claimed is:

1. An apparatus for cutting and insulation stripping of an electrical cable in an automatic cable processing machine, comprising:

a tool composed of a first blade holder member and a second blade holder member;

a respective cutting blade and two insulation stripping blades provided for each of the first blade holder member and the second blade holder member;

drive means for actuating the tool;

the insulation stripping blades of the first blade holder member being arranged at a predetermined fixed distance from the cutting blade of the first blade holder member;

the insulation stripping blades of the second blade holder member being arranged at a predetermined fixed distance from the cutting blade of the second blade holder member;

each said predetermined fixed distance corresponding to a maximum insulation stripping length which is attainable with the tool;

each of the insulation stripping blades being shorter than the cutting blades by an amount which is dimensioned such that during a first part of a work cycle of the tool the cable is cut by the cutting blades without the insulation stripping blades cutting into the electrical insulation of the cable;

said drive means for actuating the tool comprising two retraction drives for retracting cable ends, produced by cutting of the cable, away from the cutting blades and for adjusting the retracted cable ends at a position substantially corresponding to an insulation stripping length which is within a range defined by the maximum insulation stripping length;

said two retraction drives operating the tool such that during a second part of the work cycle of the tool the electrical insulation is cut by the insulation stripping blades and during a further part of the retraction movement of the cable ends while the insulation stripping blades remain in cutting position;

a respective member at which there is secured a respective one of the blade holders;

a support member provided for the lever members;

means for pivotally mounting said lever members at the support member for pivotable movement about a common pivot point;

said drive means for actuation of the tool further comprising:

two interengaging gears rotatably mounted at the support member;

first pivot means for connecting one of the interengaging gears with one of the lever members;

second pivot means for connecting the other one of the interengaging gears with the other one of the lever members;

a drive motor having a shaft at which there is mounted a pinion;

a toothed segment connected with said other interengaging gear; and said toothed segment meshes with the pinion arranged at the shaft of the drive motor.

2. The apparatus for cutting and insulation stripping of an electrical cable according to claim 1, wherein:

the insulation stripping blades comprise V-shaped insulation stripping blades arranged at the blade holders; and programmable computer means for controlling the drive means for the actuation of the tool, whereby the positions of the first and second blade holder members, during the work cycles of the tool, can be preselected by programming the programmable computer as a function of the thickness of the electrical insulation and the type of insulation stripping blades which are employed.

3. An apparatus for cutting and insulation stripping of an electrical cable in an automatic cable processing machine, comprising:

a tool composed of a first blade holder member and a second blade holder member;

a respective cutting blade and two insulation stripping blades provided for each of the first blade holder member and the second blade holder member;

drive means for actuating the tool;

the insulation stripping blades of the first blade holder member being arranged at a predetermined fixed distance from the cutting blade of the first blade holder member;

the insulation stripping blades of the second blade holder member being arranged at a predetermined fixed distance from the cutting blade of the second blade holder member;

each said predetermined fixed distance corresponding to a maximum insulation stripping length which is attainable with the tool;

each of the insulation stripping blades being shorter than the cutting blades by an amount which is dimensioned such that during a first part of a work cycle of the tool the cable is cut by the cutting blades without the insulation stripping blades cutting into the electrical insulation of the cable;

said drive means for actuating the tool comprising two retraction drives for retracting cable ends, produced by cutting of the cable, away from the cutting blades and for adjusting the retracted cable ends at a position substantially corresponding to an insulation stripping length which is within a range defined by the maximum insulation stripping length;

said two retraction drives operating the tool such that during a second part of the work cycle of the tool the electrical insulation is cut by the insulation stripping blades and during a further part of the retraction movement of the cable ends while the insulation stripping blades remain in cutting position; and each retraction drive comprising:

a base plate;

first and second bearing portions provided for each base plate;

a threaded spindle;

a drive motor having a shaft;

the shaft of the drive motor being mounted at the base plate;

the threaded spindle being mounted in the first and second bearing portions and extending substantially perpendicular to the shaft;

a respective bevel gear seated at the shaft and at the threaded spindle and meshing with one another;

support means arranged at the threaded spindle;

guide elements for guiding the support means in the second bearing portion; and a clamping device for retention of the cable secured at the support means.

4. The apparatus for cutting and insulation stripping of an electrical cable according to claim 3, wherein said guide elements comprise bolts.

5. The apparatus for cutting and insulation stripping of an electrical cable according to claim 3, further including:

programmable computer means for controlling the retraction drives; and said programmable computer means controlling, as a function of programming of the programmable computer, predetermined rotational angles of each of the threaded spindles, thereby enabling preselection of the retraction of the cable ends with respect to a predetermined insulation stripping length and also said further part of the retraction movement of the cable ends for the purpose of stripping the insulation waste.

6. The apparatus for cutting and insulation stripping of an electrical cable according to claim 2, wherein:

the insulation stripping blades comprise form insulation stripping blades arranged at the blade holders; and programmable computer means for controlling the drive means for the actuation of the tool, whereby the positions of the first and second blade holder members, during the work cycles of the tool, can be preselected by programming of the programmable computer as a function of the thickness of the electrical insulation and the type of insulation stripping blades which are employed.

* * * * *